United States Patent
Tadano

(10) Patent No.: US 8,134,126 B2
(45) Date of Patent: Mar. 13, 2012

(54) FAR-INFRARED RADIATION IMAGE PROCESSING APPARATUS, FAR-INFRARED RADIATION IMAGING APPARATUS, FAR-INFRARED RADIATION IMAGE PROCESSING METHOD, AND FAR-INFRARED RADIATION IMAGE PROCESSING PROGRAM

(75) Inventor: Shoji Tadano, Kanagawa (JP)

(73) Assignee: Sony Corporation (JP)

( * ) Notice: Subject to any disclaimer, the term of this patent is extended or adjusted under 35 U.S.C. 154(b) by 749 days.

(21) Appl. No.: 12/214,640

(22) Filed: Jun. 20, 2008

(65) Prior Publication Data
US 2009/0008552 A1    Jan. 8, 2009

(30) Foreign Application Priority Data
Jul. 4, 2007    (JP) .............................. P2007-175920

(51) Int. Cl.
*G01J 5/02*    (2006.01)
*G01J 5/10*    (2006.01)
*G06K 9/46*    (2006.01)

(52) U.S. Cl. .................. 250/330; 250/338.1; 382/274; 382/237; 348/671

(58) Field of Classification Search .......... 250/330, 250/338.1, 339.01; 382/274, 237; 348/671
See application file for complete search history.

(56) References Cited

U.S. PATENT DOCUMENTS
5,249,241 A * 9/1993 Silverman et al. .......... 382/169
6,759,949 B2    7/2004 Miyahara FOREIGN PATENT DOCUMENTS
| JP | 07-035621 A | 2/1995 |
| JP | 07-239271 A | 9/1995 |
| JP | 2000-074741 A | 3/2000 |
| JP | 2003-344167 A | 12/2003 |

* cited by examiner

*Primary Examiner* — David Porta
*Assistant Examiner* — Yara Green
(74) *Attorney, Agent, or Firm* — Lerner, David, Littenberg, Krumholz & Mentlik, LLP

(57) ABSTRACT

Disclosed herein is a far-infrared radiation image processing apparatus configured to process an image taken by detecting far-infrared rays radiated from an object, the far-infrared radiation image processing apparatus including: an image signal reception section configured to receive an image signal indicative of a far-infrared radiation image taken by a far-infrared radiation camera; an area designation reception section configure to receive area designation information input to designate a specific area of the far-infrared radiation image; and a resolution conversion section configured to convert the resolution for the amount of the far-infrared rays applicable to the specific area designated by the area designation information in the far-infrared radiation image, thereby creating resolution-converted image information.

16 Claims, 9 Drawing Sheets

FIG. 3

| | | | | | | | | | | | | | |
|---|---|---|---|---|---|---|---|---|---|---|---|---|---|
| | 0 | 1 | 0 | 0 | 0 | 1 | 0 | 0 | 0 | 1 | 0 | 0 | 0 | [bit] |
| | 0 | 1 | 2 | 3 | 4 | 5 | 6 | 7 | 8 | 9 | 10 | 11 | 12 | |
| | 0.05 | 0.1 | 0.2 | 0.4 | 0.8 | 1.6 | 3.2 | 6.4 | 12.8 | 25.6 | 51.2 | 102.4 | 204.8 | [°C] |

1101a

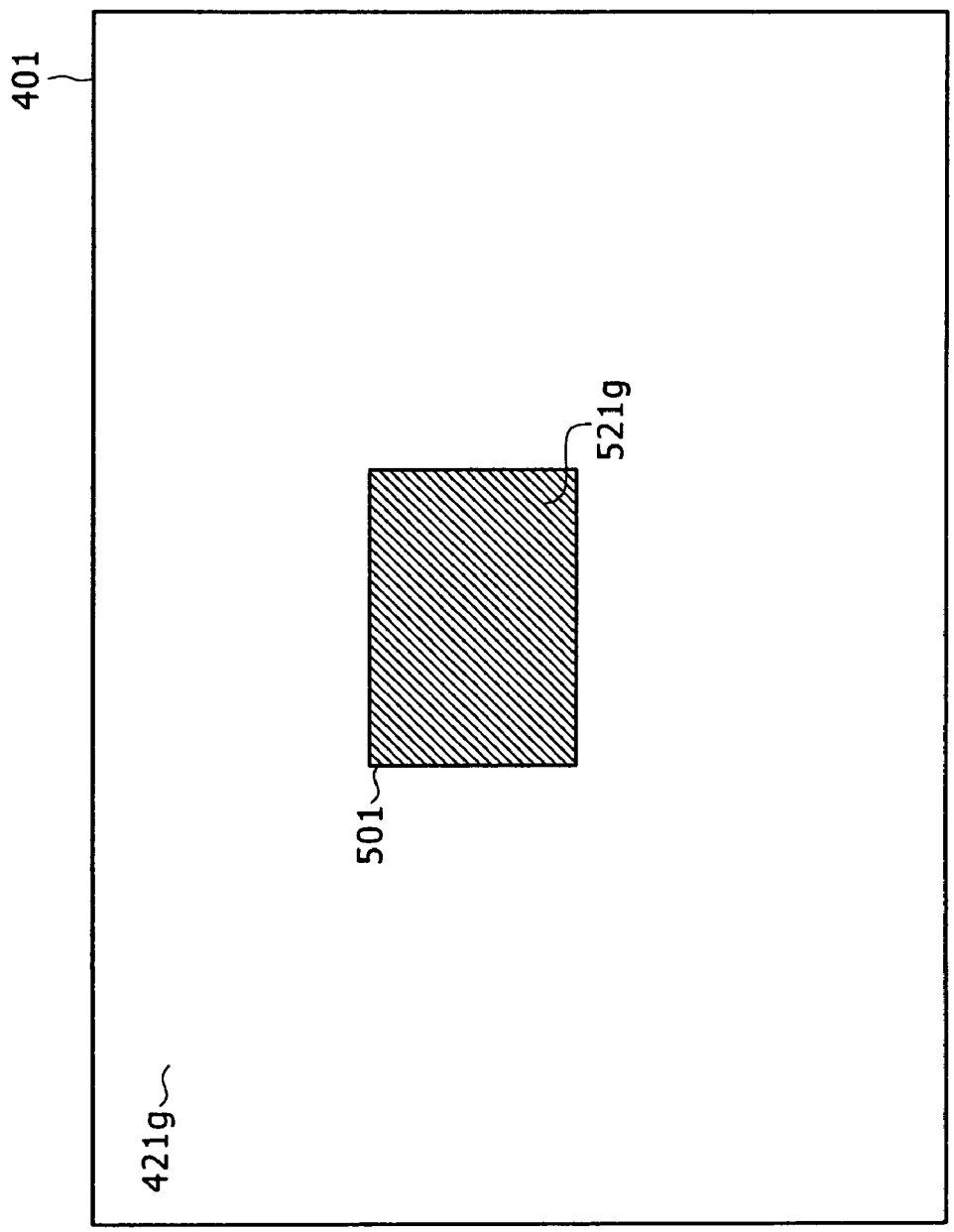

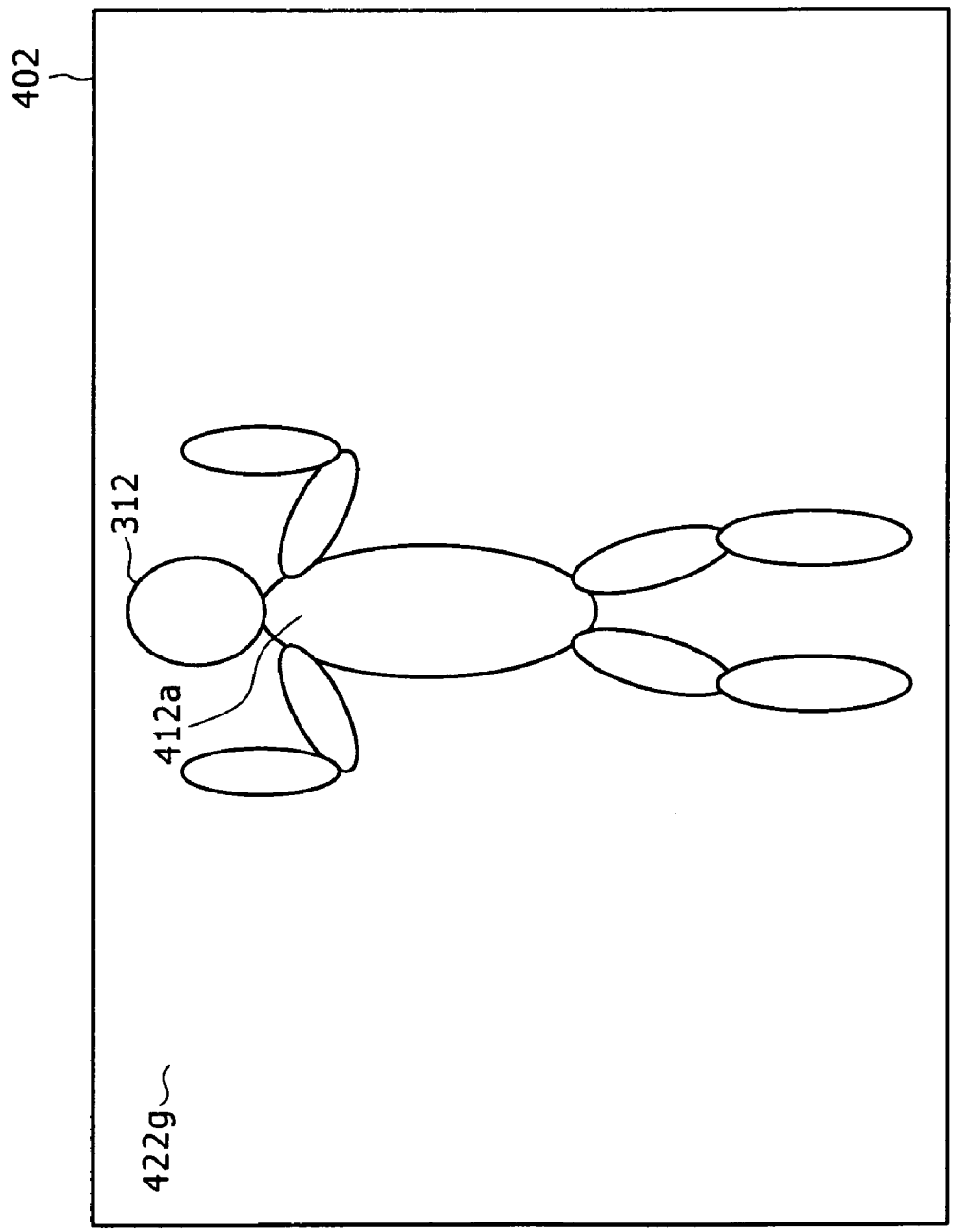

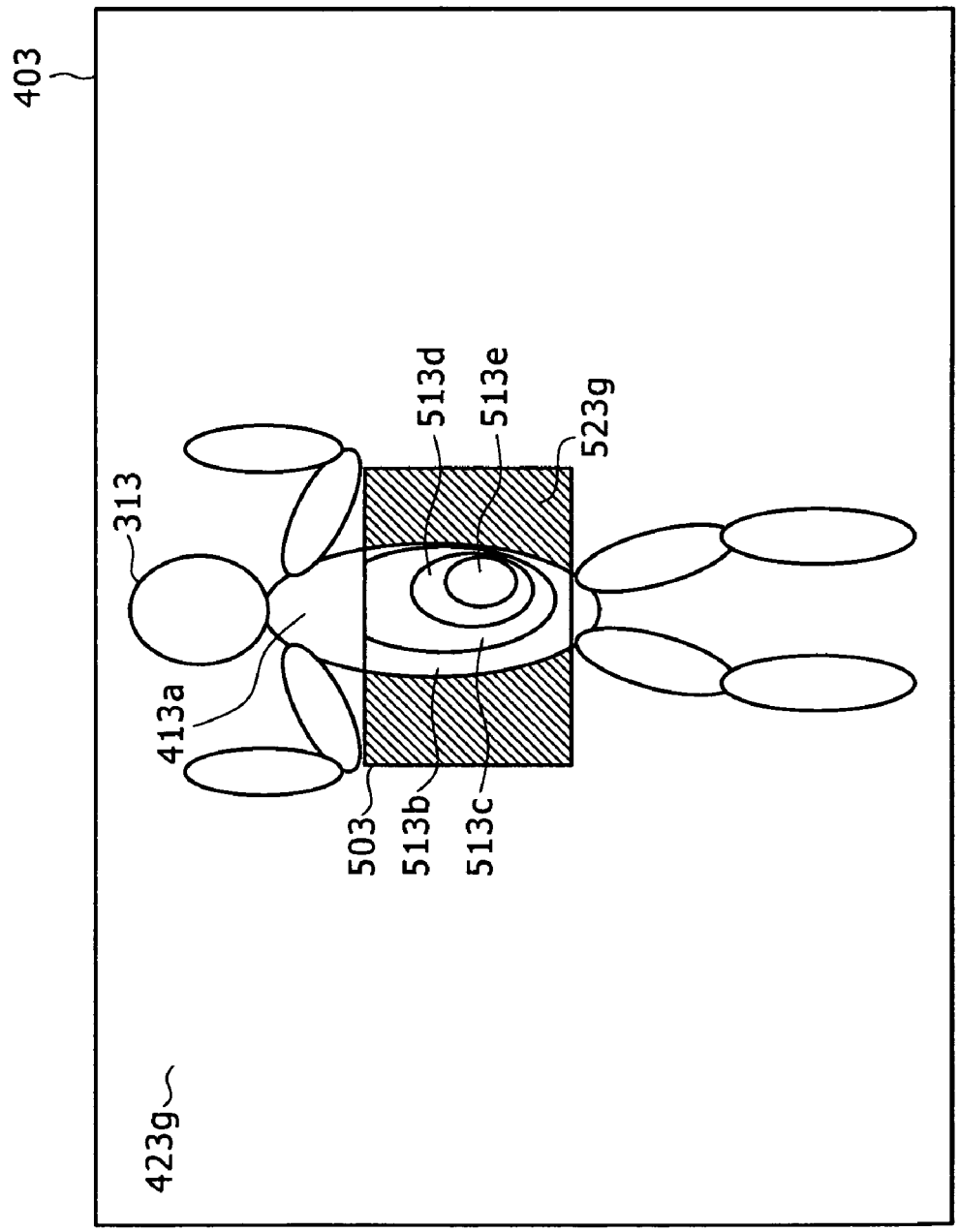

FAR-INFRARED RADIATION IMAGE PROCESSING APPARATUS, FAR-INFRARED RADIATION IMAGING APPARATUS, FAR-INFRARED RADIATION IMAGE PROCESSING METHOD, AND FAR-INFRARED RADIATION IMAGE PROCESSING PROGRAM

CROSS REFERENCES TO RELATED APPLICATIONS

The present application claims priority from Japanese Patent Application No. JP 2007-175920, filed in the Japanese Patent Office on Jul. 4, 2007, the entire content of which is incorporated herein by reference.

BACKGROUND OF THE INVENTION

1. Field of the Invention

The present invention relates to a far-infrared radiation image processing apparatus, a far-infrared radiation imaging apparatus, a far-infrared radiation image processing method, and a far-infrared radiation image processing program. More particularly, the invention relates to a far-infrared radiation image processing apparatus, a far-infrared radiation imaging apparatus, a far-infrared radiation image processing method, and a far-infrared radiation image processing program for processing far-infrared radiation images taken by detecting far-infrared rays radiated from objects.

2. Description of the Related Art

There exist far-infrared radiation imaging apparatuses, a type of equipment for thermography whereby a given object is imaged using a far-infrared radiation sensor to measure the temperatures of the object being imaged. The far-infrared radiation sensor is typically made up of picture elements such as pyroelectric elements or bolometers capable of detecting the energy (heat) from the far-infrared rays being radiated by the imaged object.

When an image of the object is taken by the above type of far-infrared radiation imaging apparatus, the image is constituted by pixels. If the actually output pixels have numerically large increments, then the resolution of the output values drops unless the range of gray-scale levels is enlarged for representing the measurements in image form. Conversely, if the resolution is increased with the gray-scale range kept unchanged, then the range of the temperatures that can be displayed is narrowed. For example, if a far-infrared radiation image taken by a far-infrared radiation camera in increments of 0.05° C. is displayed on a 256-level gray-scale monitor, then the maximum difference between the lowest and the highest temperatures that can be displayed is mere 12.8° C.

There have been proposed infrared radiation temperature measuring apparatuses such as one disclosed in Japanese Patent Laid-Open No. Hei 07-035621, referred to as the Patent Document 1 hereunder. This type of apparatus displays an infrared radiation image taken by an infrared radiation camera to indicate temperature information about a given object. When a given spot of the displayed image is designated, the apparatus displays the temperature corresponding to the designated spot.

Also proposed are far-infrared radiation image displaying apparatuses such as one disclosed in Japanese Patent Laid-Open No. Hei 07-239271, referred to as the Patent Document 2 hereunder. Where calculated data fails to fill a full-scale data range, this type of apparatus performs bit shift operations to create image display data with as many bits as requested by a signal processing section of the apparatus.

There have been proposed imaging apparatuses such as one disclosed in Japanese Patent Laid-Open No. 2000-074741, referred to as the Patent Document 3 hereunder. Where a low-illumination object and a high-illumination object coexist within a single frame, this type of apparatus offsets the signal levels involved and suitably controls their amplification factors.

Further proposed are far-infrared radiation camera systems such as one disclosed in Japanese Patent Laid-Open No. 2003-344167, referred to as the Patent Document 4 hereunder. Based on the relative temperature distribution of an image signal which is proportionate to the temperatures of an object radiating infrared rays, this type of apparatus narrows the range of the temperatures at low concentrations so as to highlight temperature resolution selectively.

SUMMARY OF THE INVENTION

There are cases where it is desired to detect fine differences in temperature between different spots on the surface of an object being imaged, or to express a detailed state of the imaged object being detected. In such cases, according to the existing techniques outlined above, it may be impossible to represent a particular spot on the imaged object or fine differences around that spot without highlighting the background or nearby objects other than the object being detected.

For example, according to the technique disclosed by the above-cited Patent Document 1, it is possible to know the detailed temperature of a specific spot in an object image. However, it may be impossible visually to display detailed differences in surface temperature between nearby spots of the object being imaged.

According to the technique disclosed by the above-cited Patent Document 2, it may not be possible to obtain sufficient resolution if there is a large difference in temperature between different spots over the entire imaged range (especially if a heated object and a low-temperature object are included in the imaged range or if a huge difference in temperature exists between the imaged object and its background).

According to the technique disclosed by the above-cited Patent Document 3, a signal level is automatically offset depending on the frequency with which the signal level indicative of a detected amount of infrared rays (i.e., temperature) appears. It follows that the disclosed technique is not suitable for cases where a particular object or a specific range of objects to be imaged has been determined in advance.

According to the technique disclosed by the above-cited Patent Document 4, the range of temperatures at high concentrations (i.e., with high frequencies of appearance) detected by a far-infrared radiation camera is automatically highlighted in order to enhance the resolution of a particular range of temperatures. It follows that like the technique of the Patent Document 3, this technique is not suitable for cases in which a particular object or a specific range of objects to be imaged has been selected beforehand.

The present invention has been made in view of the above circumstances and provides a far-infrared radiation image processing apparatus, a far-infrared radiation imaging apparatus, a far-infrared radiation image processing method, and a far-infrared radiation image processing program for displaying detailed output values of a specific area in a far-infrared radiation image.

In carrying out the present invention and according to one embodiment thereof, there is provided a far-infrared radiation image processing apparatus for processing an image taken by detecting far-infrared rays radiated from an object, the far-infrared radiation image processing apparatus including: an image signal reception section configured to receive an image signal indicative of a far-infrared radiation image taken by a far-infrared radiation camera; an area designation reception section configure to receive area designation information input to designate a specific area of the far-infrared radiation image; and a resolution conversion section configured to convert the resolution for the amount of the far-infrared rays applicable to the specific area designated by the area designation information in the far-infrared radiation image, thereby creating resolution-converted image information.

Where the inventive far-infrared radiation image processing apparatus outlined above is in use, the image signal reception section first receives an image signal indicative of a far-infrared radiation image taken by a far-infrared radiation camera. The area designation reception section of the apparatus receives area designation information input to designate a specific area of the far-infrared radiation image. The resolution conversion section of the apparatus then converts the resolution for the amount of the far-infrared rays applicable to the specific area designated by the area designation information in the far-infrared radiation image, creating resolution-converted image information.

According to the far-infrared radiation image processing apparatus of one embodiment of the present invention, the resolution for the amount of the far-infrared rays applicable to only the specific area of interest in the far-infrared radiation image is converted. That is, the resolution of the specific area can be set as desired while the resolution of the image as a whole is maintained. This makes it possible to express in a more appropriate manner the area of particular interest of the object being imaged while the overall image is presented.

BRIEF DESCRIPTION OF THE DRAWINGS

Further objects and advantages of the present invention will become apparent upon a reading of the following description and appended drawings in which:

FIG. 3 is a schematic view explanatory of an image signal indicating the amount of far-infrared rays detected by the far-infrared radiation imaging apparatus;

FIG. 7 is a schematic view explanatory of a display screen;

FIG. 8 is a schematic view explanatory of how an imaged object is typically displayed on the display screen; and FIG. 9 is a schematic view explanatory of how the resolution of the display screen displaying the imaged object is typically converted.

DETAILED DESCRIPTION OF THE PREFERRED EMBODIMENTS

Figure 1:
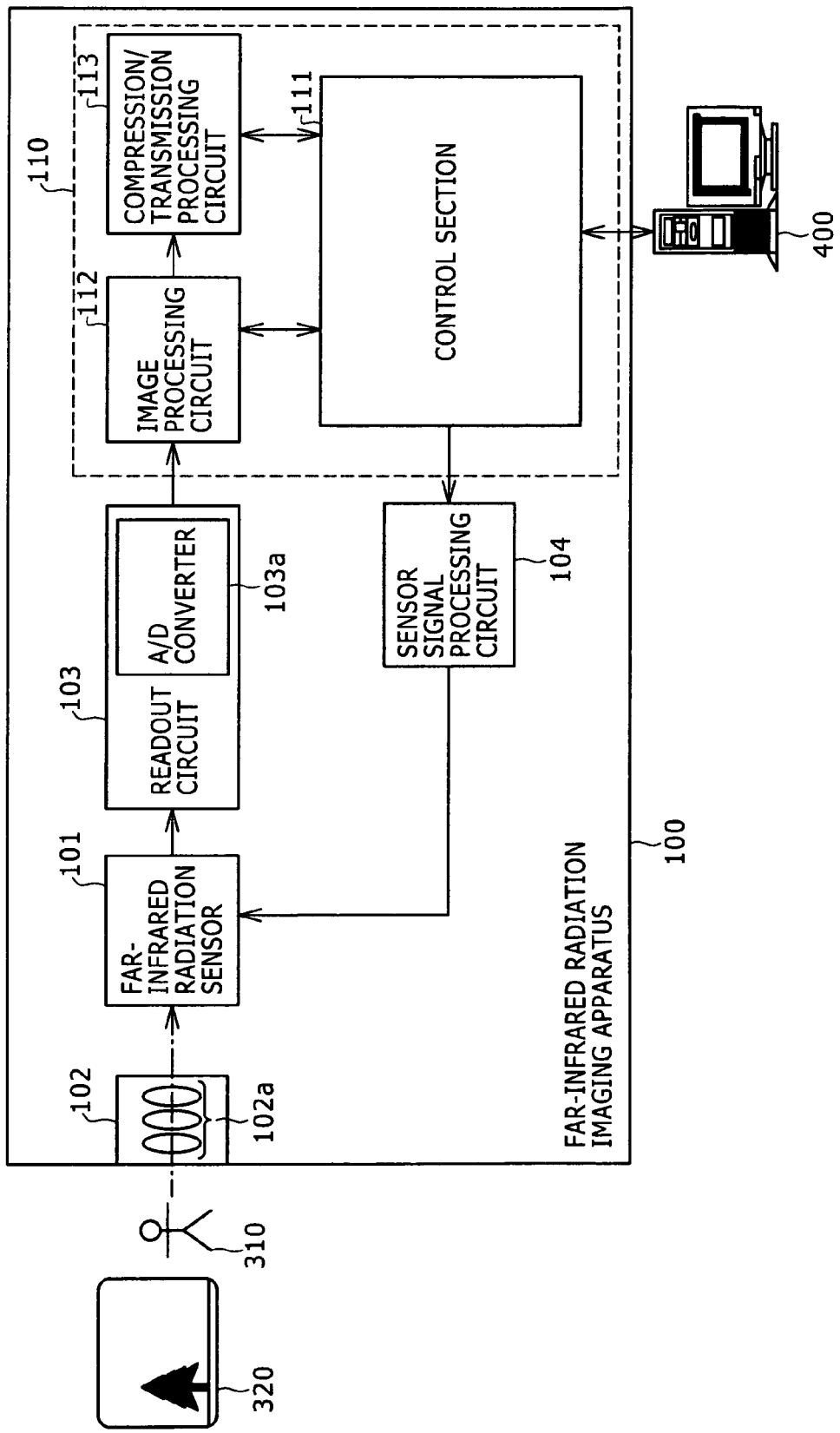
FIG. 1 is a block diagram of a far-infrared radiation imaging apparatus.

The preferred embodiments of the present invention will now be described in detail with reference to the accompanying drawings. FIG. 1 is a block diagram of a far-infrared radiation imaging apparatus 100 embodying the invention. In FIG. 1, the far-infrared radiation imaging apparatus 100 is made up of a far-infrared radiation sensor 101, an optical block 102, a readout circuit 103, a sensor signal processing circuit 104, and an image processing section 110.

The optical block 102 is constituted by lenses 102a for focusing the light from an object onto the far-infrared radiation sensor 101, by a drive mechanism (not shown) for focusing and zooming through lens movement, and by an iris control mechanism (not shown). The moving parts of these mechanisms are driven by control signals issued by a control section 111 included in the image processing section 110.

The far-infrared radiation sensor 101 has a large number of far-infrared radiation sensing elements and detects the amount of far-infrared rays coming into the far-infrared radiation imaging apparatus 100 and incident on each of the sensing elements. The far-infrared radiation sensor 101 is formed by the far-infrared radiation sensing elements such as pyroelectric elements or bolometers for sensing the energy (i.e., heat) of radiated far-infrared rays. The amount of the far-infrared rays incident on each of the far-infrared radiation sensing elements is detected. The quantities of the detected far-infrared rays from the sensing elements are output in the form of analog image waveforms to be acquired by the readout circuit 103. Furthermore, the signal readout timing of the far-infrared radiation sensor 101 is controlled in keeping with control signals coming from the sensor signal processing circuit 104.

The readout circuit 103 is a front-end circuit that operates under control of the control section 111. The readout circuit 103 has an A/D converter 103a that converts the analog image waveforms output by the far-infrared radiation sensor 101 into a 13-bit image signal. In its initial state, the A/D converter 103a outputs an image signal with a bit count of 8,192 at 409.55° C. off the object of interest being imaged and an output signal with the gray-scale level "0" at 0° C. The A/D converter 103a is designed to indicate in increments of 0.05° C. the temperatures detected by the far-infrared radiation sensor 101. These settings may be varied as desired.

The sensor signal processing circuit 104 outputs control signals for controlling the far-infrared radiation sensor 101 under control of the control section 111 as part of the image processing section 110. The far-infrared radiation sensor 101 operates in accordance with these control signals.

The image processing section 110 includes the control section 111, an image processing circuit 112, and a compression/transmission processing circuit 113. The control section 111 is a micro controller typically constituted by a CPU (central processing unit), a ROM (read only memory) and a RAM (random access memory). The control section 111 provides overall control of the components of the far-infrared radiation imaging apparatus 100 by executing appropriate programs stored in the ROM or elsewhere.

From the image signal processed by the image processing circuit 112, the control section 111 extracts the gray-scale levels of all far-infrared radiation sensing elements. The control section 111 has a register block 110b (see FIG. 2) containing two registers: an area designation register 110b1 that receives area designation information input to designate a specific area of a far-infrared radiation image, and a bit designation register 110b2 that receives resolution information input to indicate resolution.

As will be discussed later in detail with reference to FIG. 6, the control section 111 creates an intra-area resolution-converted image in which the resolution for the amount of far-infrared rays applicable to the specific area designated by the area designation information is converted, and outputs resolution-converted image information indicative of the intra-area resolution converted image thus created.

Under control of the control section 111, the image processing circuit 112 processes the signal digitized by the A/D converter 103a into data constituting a suitable image signal. The far-infrared radiation image data thus processed by the image processing circuit 112 is output to the compression/transmission processing circuit 113 and control section 111.

The compression/transmission processing circuit 113 processes the far-infrared radiation image data processed by the image processing circuit 112 before sending the processed data to a computer 400. The compression/transmission processing circuit 113 operates under control of the control section 111 and subjects the signal coming from the image processing circuit 112 to data compression encoding in a suitable still image data format such as JPEG (Joint Photographic Experts Group standard).

The compression/transmission processing circuit 113 may also be arranged to effect compression encoding on moving images in MPEG (Moving Picture Experts Group) format. The computer 400 is connected to the far-infrared radiation imaging apparatus 100 through communication means such as a LAN (local area network), and includes an input section, an output section, a display section, and a recording medium section (none shown). The input section receives input of the operations performed by the user on the far-infrared radiation imaging apparatus 100. The output section outputs the control signals reflecting the input to the control section 111. The display section displays images taken by the far-infrared radiation imaging apparatus 100. The recording medium section records image data constituting the images taken by the far-infrared radiation imaging apparatus 100, and retrieves the data designated by control signals coming from the control section 111. The retrieved data is output to the control section 111.

The basic workings of the far-infrared radiation imaging apparatus 100 will now be explained. Under control of the control section 111, the far-infrared radiation sensor 101 senses the far-infrared rays radiated from an imaged object 310 and a background 320 in accordance with the control signals output by the sensor signal processing circuit 104. Based on the far-infrared rays thus detected, the far-infrared radiation sensor 101 outputs analog image waveforms indicative of a far-infrared radiation sensing signal. The sensing signal is then fed successively to the readout circuit 103 in which the A/D converter 103a converts the signal into a digital signal representing gray-scale levels.

The image processing circuit 112 corrects the digital signal coming from the readout circuit 103 following analog-to-digital conversion by the A/D converter 103. The digitized image signal thus processed is sent to the compression/transmission processing circuit 113.

The compression/transmission processing circuit 113 subjects the supplied image signal to compressing encoding. The compression-encoded data is sent to the computer 400 through the control section 111. The far-infrared radiation image taken by the far-infrared radiation imaging apparatus 100 is displayed in the manner described above. Looking at the displayed image, the user is able to know the surface temperatures of the imaged object 310.

The sensing signal representing the detected far-infrared rays and output by the far-infrared radiation sensor 101 is converted by the A/D converter 103a of the readout circuit 103 into the digital signal which indicates gray-scale levels and which is forwarded to the image processing section 110. As will be discussed in more detail with reference to FIG. 3, the digital signal indicative of gray-scale levels is expressed in binary form using a 13-bit sequence. The image processing section 110 extracts a continuous eight-bit sequence from the 13-bit sequence of the digital signal and sends what is extracted as resolution-converted image information to the computer 400 through the control section 111. At this point, the image processing section 110 converts the resolution for the amount of far-infrared rays by varying that position of the digital signal from which to extract the partial bit sequence.

As one preferred embodiment of the invention, the far-infrared radiation imaging apparatus 100 has the image processing section 110 and the far-infrared radiation sensor 101, optical block 102, readout circuit 103, and sensor signal processing circuit 104 integrated in a single enclosure for taking far-infrared radiation images. However, this is not limitative of the present invention. Alternatively, the far-infrared radiation imaging apparatus 100 may be divided into a far-infrared radiation camera for taking far-infrared radiation images, and a far-infrared radiation image processing apparatus. The far-infrared radiation image processing apparatus may include the above-described image processing section 110 for processing far-infrared radiation images taken by the far-infrared radiation camera.

Figure 2:
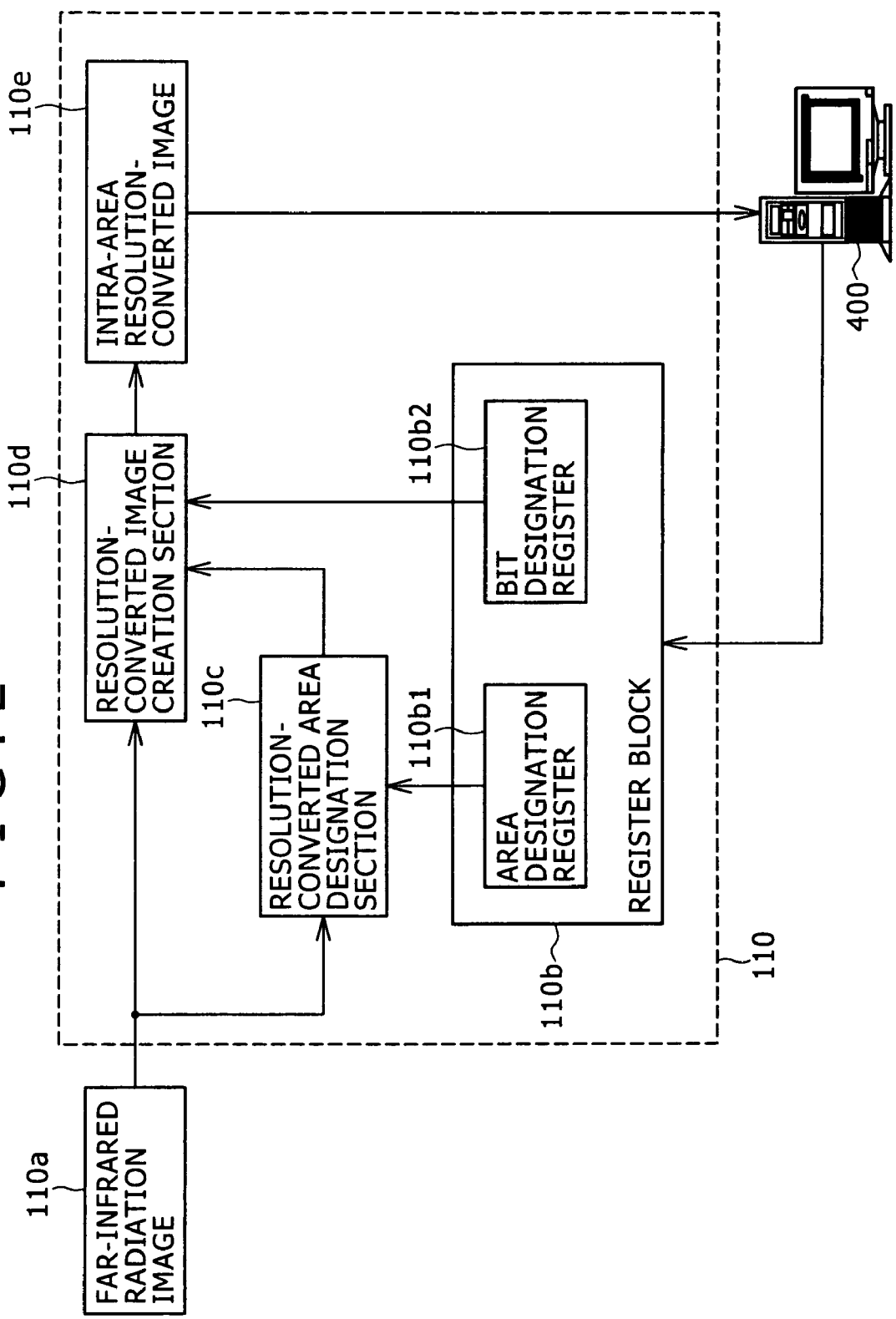
FIG. 2 is a block diagram explanatory of typical processes performed by an image processing section of the apparatus.

What follows is a detailed description of how resolution conversion is accomplished by the far-infrared radiation imaging apparatus. FIG. 2 is a block diagram explanatory of typical processes performed by the image processing section 110 of the apparatus. As shown in FIG. 2, the image processing section 110 contains the register block 110b and receives a far-infrared radiation image 110a. The received far-infrared radiation image is processed by a resolution-converted area designation section 110c and a resolution-converted image creation section 110d. The processing provides resolution-converted image information (see FIG. 4) indicative of an intra-area resolution-converted image 110e. This information is output to the computer 400.

The image processing section 110 receives an image signal (see FIG. 3) that indicates the amount of the far-infrared rays detected by the far-infrared radiation sensor 101. This image signal is constituted by a 13-bit sequence expressing in binary form the amount of the far-infrared rays applicable to each of the pixels involved.

The register block 110b is a storage area inside the control section 111 as part of the image processing section 110. As such, the register block 110b includes an area designation register 110b1 and a bit designation register 110b2. The register block 110b may receive and store the data that may be sent from the computer 400 over the LAN or the like.

The area designation register 110b1 receives input of the area designation information (see FIG. 7) indicative of the resolution-converted area designated within the far-infrared radiation image 110a. The area designation register 110b1 may store the area designation information thus received.

The resolution-converted area may be varied as desired in terms of size, position, and shape.

From the computer 400, the bit designation register 110b2 receives input of the resolution information indicative of the resolution into which to convert data. The bit designation register 110b2 may store the resolution information thus received. By utilizing the resolution information, the user may specify whether or not to create a resolution-converted area to resolution conversion.

As described, the register block 110b allows the user to set the desired resolution-converted area and the target resolution through the computer 400. The register block 110b may further store the resolution-converted area and the resolution desired by the user.

Described below are the processes carried out by the image processing section 110 to convert the resolution of a far-infrared radiation image. The image processing section 110 first causes the resolution-converted area designation section 110*c* to read the area designation information received by the area designation register 110*b*1.

The image processing section 110 then causes the resolution-converted image creation section 110d to convert the resolution of the pixels constituting the resolution-converted area (see FIG. 7) from the image signal of the far-infrared radiation image 110*a*, on the basis of the area designation information read by the resolution-converted area designation section 110*c*. At the same time, the image processing section 110 converts the pixels in the areas other than the resolution-converted area into a predetermined resolution, thereby creating an intra-area resolution-converted image 110*e*. With regard to solely the pixels included in the resolution-converted area out of the pixels making up the far-infrared radiation image 110*a*, the image processing section 110 makes the position from which to extract a partial bit sequence of the image signal, different from the comparable position outside the resolution-converted area, thus creating the intra-area resolution-converted image 110*e* converted to the resolution designated by the resolution information.

The image processing section 110 outputs the created intra-area resolution-converted image 110*e* to the computer 400 as resolution-converted image information. The resolution-converted image information is constituted numerically by a continuous eight-bit partial sequence taken from the bit sequence of the image signal. As will be discussed later in detail with reference to FIGS. 7 through 9, the computer 400 displays on its monitor the intra-area resolution-converted image 110*e* at 256 gray-scaly levels based on the output resolution-converted image information.

The resolution of the pixels in the areas other than the resolution-converted area is minimized in order to maximize the range for displaying the position in which to extract the partial bit sequence from the bit sequence of the image signal. Alternatively, the resolution may be set as desired.

As another alternative, the resolution of the pixels in the areas other than the resolution-converted area may also be converted in the same manner as the resolution of the resolution-converted area and independently of the resolution-converted area. This makes it possible to display at an appropriate resolution the amount of the far-infrared rays (i.e., surface temperature of the imaged object) from the areas other than the resolution-converted area.

What follows is an explanation of the conversion of the resolution for the resolution-converted area. FIG. 3 is a schematic view explanatory of an image signal 1101*a* indicating the amount of far-infrared rays detected by the far-infrared radiation imaging apparatus.

The mage signal 1101*a* is made up of 13-bit data corresponding to each pixel. The signal represents in binary form the amount of the far-infrared rays detected by the far-infrared radiation sensor 101 per pixel. The digit places making up the image signal 1101*a* correspond to "0.05° C.," "0.1° C.," . . . , "102.4° C.," and "204.8° C.," in that order from right to left. Altogether, the digit places can express temperatures ranging from 0° C. to 409.55° C. Illustratively, the image signal 1101*a* in FIG. 3 indicates 27.3° C.

Figure 4:
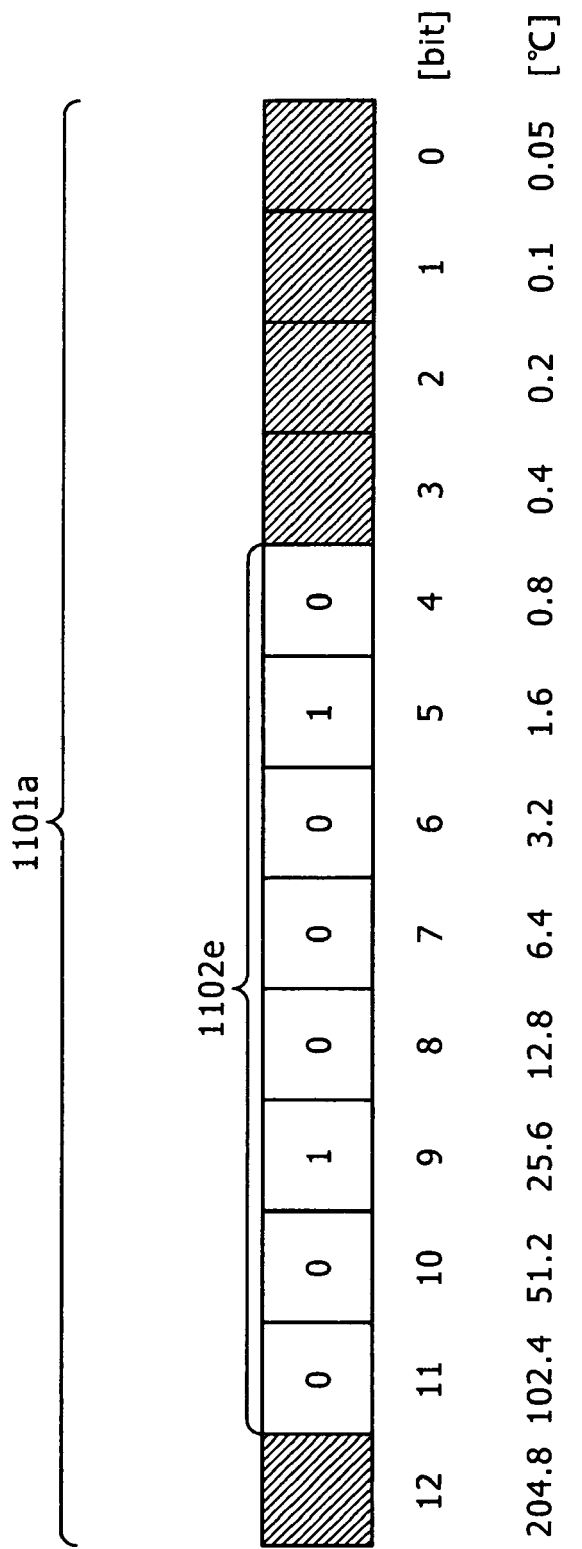
FIG. 4 is a schematic view explanatory of resolution-converted image information acquired by conversion of the resolution of the image signal.
Figure 5:
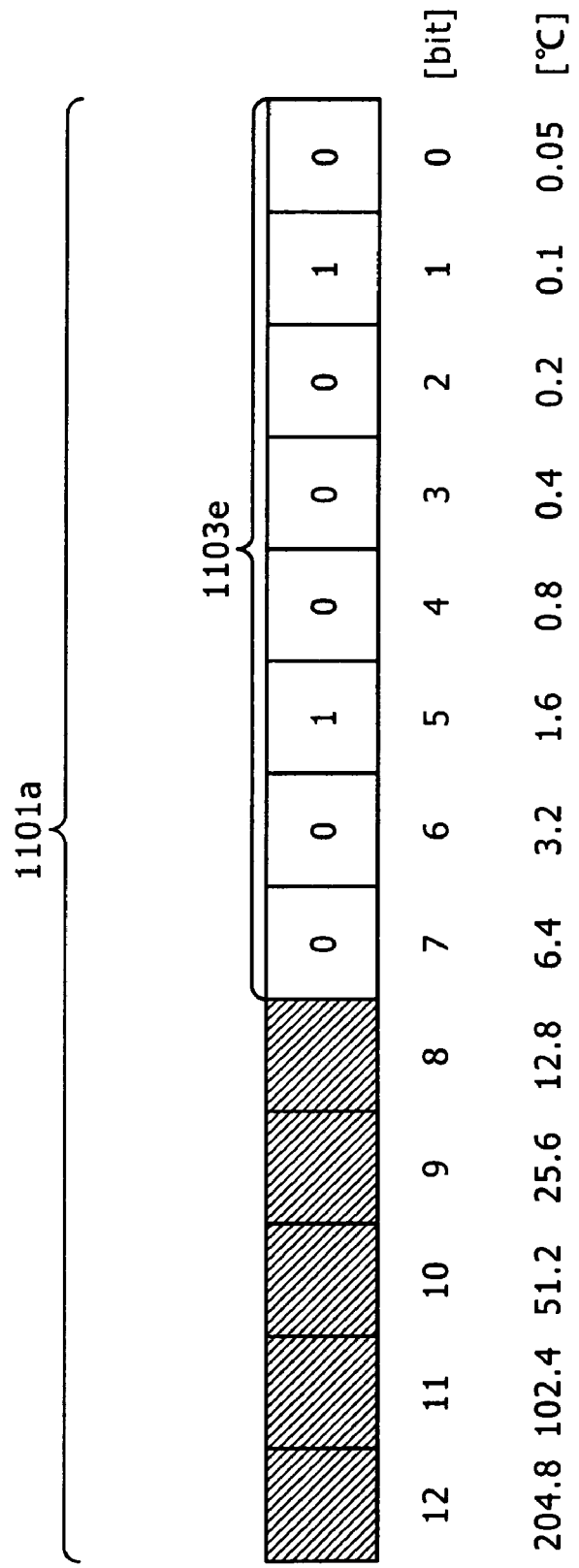
FIG. 5 is another schematic view explanatory of resolution-converted image information acquired by conversion of the resolution of the image signal.
Figure 6:
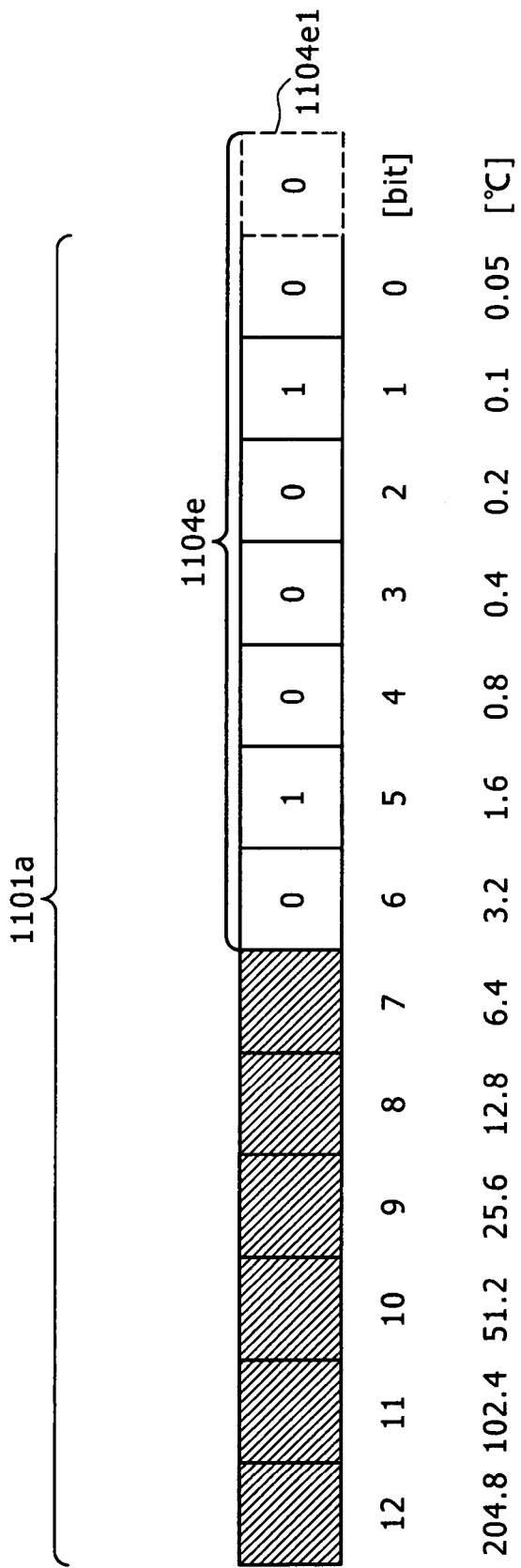
FIG. 6 is another schematic view explanatory of resolution-converted image information acquired by conversion of the resolution of the image signal.

FIGS. 4, 5 and 6 are schematic views explanatory of resolution-converted image information acquired by conversion of the resolution of the image signal. Resolution-converted image information 1102e shown in FIG. 4 is formed by an eight-bit sequence ranging from bit 4 through bit 11 extracted from the 13-bit sequence constituting the image signal 1101*a* (FIG. 3). The resolution-converted image information 1102e represents gray-scale levels for the areas other than the resolution-converted area following resolution conversion.

Depending on bit 12 being either "0" or "1," the resolution-converted image information 1102e represents a different range of temperatures. If bit 12 is "0," then the resolution-converted image information 1102e represents temperatures ranging from "0° C." to "204.0° C." in increments of 0.8° C. at 256 gray-scale levels. If bit 12 is "1," the resolution-converted image information 1102e denotes temperatures ranging from "204.8° C." to "408.8° C." in increments of 0.8° C. at 256 gray-scale levels.

As described above, the resolution of the pixels in the areas other than the resolution-converted area is set to be relatively low, while the range for displaying the position in which to extract the partial bit sequence from the bit sequence of the image signal is made relatively wide. For example, an eight-bit sequence ranging from bit 4 to bit 11 may be set to be extracted from the 13-bit sequence of the image signal 1101*a* as shown in FIG. 4. Alternatively, these settings may be varied as desired.

Illustratively, as initial settings, the resolution of the pixels in the areas other than the resolution-converted area may be minimized so as to maximize the range for displaying the position in which to extract an eight-bit sequence ranging from bit 5 to bit 12. That is, of the far-infrared radiation image taken by the far-infrared radiation imaging apparatus 100, those areas other than the resolution-converted area which are generally considered to be of low interest may be set for a minimum resolution. This makes it possible for the resolution-converted area to draw the user's attention directed at the far-infrared radiation image displayed on the monitor (not shown) of the computer 400 and to have the computer 400 and other hardware resources concentrated on the resolution-converted area.

Alternatively, the resolution of the pixels in the areas other than the resolution-converted area may be converted in the same manner as the resolution of the resolution-converted area and independently of the resolution-converted area. The arrangement makes it possible to keep relatively low the resolution of those areas other than the resolution-converted area which are generally considered to be of low interest in the far-infrared radiation image taken by the far-infrared radiation imaging apparatus 100. Whenever there arises a need for paying attention to any area other than the resolution-converted area, this arrangement allows the user to increase the resolution of that area of interest for better scrutiny.

Resolution-converted image information 1103e shown in FIG. 5 is formed by an eight-bit sequence ranging from bit 0 through bit 7 extracted from the 13-bit sequence constituting the image signal 1101*a*. Depending on what is denoted by bits 12 through 8, the resolution-converted image information 1103e represents a different range of temperatures. Illustratively, if bits 12 through 8 are all "0's," then the resolution-converted image information 1103e represents temperatures ranging from "0° C." to "12.75° C." in increments of "0.05° C." at 256 gray-scale levels.

As described, the far-infrared radiation imaging apparatus 100 of this embodiment creates resolution-converted image information by extracting a continuous eight-bit sequence from the 13-bit sequence making up the image signal. With regard to solely the pixels included in the resolution-converted area, the far-infrared radiation imaging apparatus 100 makes the position from which to extract the partial bit sequence of the image signal different from the comparable position outside the resolution-converted area. This changes the resolution of the pixels constituting the resolution-converted area.

Resolution-converted image information 1104e shown in FIG. 6 is formed by a seven-bit sequence ranging from bit 0 through bit 6 extracted from the 13-bit sequence constituting the image signal 1101a. It should be noted that an additional bit is attached to the least significant bit position of the seven-bit sequence.

Depending on what is denoted by bits 12 through 7, the resolution-converted image information 1104e represents a different range of temperatures. Illustratively, if bits 12 through 7 are all "0's," then the resolution-converted image information 1104e represents temperatures ranging from "0° C." to "6.35° C." in increments of 0.05° C. at 128 gray-scale levels. In this manner, the far-infrared radiation image output by the far-infrared radiation sensor 101 may be displayed using the bit sequence of a resolution lower than the resolution for digitized display.

With this embodiment, as discussed above, a desired continuous bit sequence may be extracted from the digitized image information making up the far-infrared radiation image. Where the minimum increments of temperatures displayed as detected output values are kept unchanged, the image processing section 110 of the embodiment may reduce the number of gray-scale levels at which to display the intra-area resolution-converted image. This helps the user easily to recognize temperature differences in the displayed image.

If the user wishes to stress the difference between temperatures, all that needs to be done is to shift right the bits to be extracted from the bit sequence. Every time the bits to be extracted are shifted right one place, the number of gray-scale levels is halved and the difference between temperatures is doubly emphasized.

Described below is what is displayed and how it is displayed on the monitor screen of the computer 400 based on the far-infrared radiation image taken by the far-infrared radiation imaging apparatus 100. FIG. 7 is a schematic view explanatory of a typical display screen. Where resolution conversion is being performed as designated by the user, with no input coming from the far-infrared radiation sensor 101, the monitor (not shown) of the computer 400 provides a display screen 401 such as one shown in FIG. 7.

The display screen 401 has a resolution-converted area 501 in which the resolution for the amount of the pixels representing detected far-infrared rays is converted. Under control of the image processing section 110, the resolution-converted area 501 is displayed at a resolution of the image signal different from the resolution for the other areas.

On the display screen 401, the pixels with the same amount of detected far-infrared rays each are arranged to be displayed at the same gray-scale level. Since there is no input from the far-infrared ray radiation sensor 101, the level of the image signal remains unchanged. All that is inside the resolution-converted area 501 (area 521g) is displayed at the same gray-scale level, and so is outside (areas 421g) the resolution-converted area 501 given the same level of the image signal. The resolution-converted area 501 may be varied as desired in terms of size, position, and shape depending on the purpose or the imaged object.

FIG. 8 is a schematic view explanatory of how an imaged object is typically displayed on the display screen. Where an object 312 is being imaged by the far-infrared radiation sensor 101, with no resolution conversion performed as designated by the user, a display screen 402 such as one shown in FIG. 8 appears on the monitor (not shown) of the computer 400.

The display screen 402 is shown displaying the object 312 imaged by the far-infrared radiation sensor 101. Set for a low resolution, the display screen 402 displays the entire imaged object 312 on the same gray-scale level despite slight differences between surface temperatures of the object. The imaged object 312 thus forms a single area (area 412a). The areas other than the imaged object 312 (i.e., areas 422g) are also displayed on the same gray-scale level because of their low resolution.

FIG. 9 is a schematic view explanatory of how the resolution of the display screen displaying the imaged object is typically converted. Where an object 313 is being imaged by the far-infrared radiation sensor 101, with the resolution converted as designated by the user, the monitor (not shown) of the computer 400 provides a display screen 403 such as one shown in FIG. 9.

The display screen 403 is shown displaying the object 313 imaged by the far-infrared radiation sensor 101. On the display screen 403 as on the display screen 401 in FIG. 7, there is provided a resolution-converted area 503 in which the resolution for the amount of the pixels representing detected far-infrared rays is converted.

The resolution of the pixels inside the resolution-converted area 503 is set to be different from the resolutions for the other areas (areas 413a and 423g). Generally, the resolution of the resolution-converted area 503 is set to be higher than that of any other area. Within the resolution-converted area 503, a plurality of gray-scale levels are used to represent different amounts of detected far-infrared rays in areas such as 513b, 513c, 513d, 513e, and 523g.

The areas other than the resolution-converted area 503 (i.e., 413a and 423g) are displayed on the same gray-scale level because of their low resolution as in the case of FIG. 8.

According to the embodiment of the invention described above, a human body being imaged may be displayed illustratively with its face portion shown at a relatively low resolution while the pockets of the coat, shirt or pants worn by the body may be emphasized for increased scrutiny of uneven pocket shapes and suspicious contents inside.

Many people under interrogation tend to feel their body temperature rise in the face portion upon telling a lie. If the face portion of the person being interrogated is designated as the resolution-converted area according to the invention, then it is possible to better scrutinize the temperature of the person's face while observing the movements of his or her entire body.

Part of the functions of the far-infrared radiation imaging apparatus 100 embodying the present invention may be implemented by a computer. In that case, programs describing the processes to be performed by these functions will be offered to the user. Running such programs on a suitable computer causes the equipment to execute the corresponding processes. The programs describing these processes may be recorded on computer-readable recording media such as magnetic recording devices, optical disks, magneto-optical recording media, and semiconductor memories.

The programs may be distributed by means of portable recording media such as optical disks on which the programs are stored. Alternatively, the programs may be stored in a storage device of a server computer. In this setup, the programs may be transferred from the server computer to other computers via a suitable network.

The computer set aside for program execution may have the programs installed into its own storage device following the program transfer from a portable recording medium or from the server computer. The computer may then retrieve the programs from its storage device and carry out the processes in accordance with the retrieved programs. As another alternative, the computer may retrieve the programs directly from the portable recording medium for processing as per the programs. As a further alternative, the computer may execute the process corresponding to a given program every time such a program is transferred from the server computer.

It should be understood by those skilled in the art that various modifications, combinations, sub-combinations and alterations may occur depending on design requirements and other factor in so far as they are within the scope of the appended claims or the equivalents thereof.

What is claimed is:

1. A far-infrared radiation image processing apparatus configured to process an image taken by detecting far-infrared rays radiated from an object, said far-infrared radiation image processing apparatus comprising:
   an image signal reception section configured to receive an image signal indicative of a far-infrared radiation image taken by a far-infrared radiation camera;
   area designation reception means configured to receive area designation information input to designate a specific area of said far-infrared radiation image; and
   a resolution conversion section configured to convert the resolution for the amount of the far-infrared rays applicable to said specific area designated by said area designation information in said far-infrared radiation image, thereby creating resolution-converted image information,
   wherein for respective pixels of the far-infrared radiation image, said image signal includes a corresponding binary bit sequence of a common predetermined length representing the amount of the far-infrared rays detected at that pixel, and
   said resolution conversion section converts, to a desired resolution, the resolution for the amount of the far-infrared rays applicable to the specific area by extracting, for respective pixels within the specific area, a continuous bit string within the corresponding binary bit sequence for that pixel such that a position of the continuous bit string within the binary bit sequence represents the desired resolution, the continuous bit string having a length smaller than the predetermined length, the continuous bit string being associated with a lower range of temperatures in response to a particular bit of the corresponding binary bit sequence being a first value and being associated with a higher range of temperatures in response to the particular bit being a second value.

2. The far-infrared radiation image processing apparatus according to claim 1, further comprising
   resolution reception section configured to receive resolution information input to indicate the desired resolution for use by said resolution conversion section for conversion; wherein said resolution conversion section creates said resolution-converted image information in which the resolution for the amount of said far-infrared rays applicable to said specific area designated by said area designation information is converted to the desired resolution indicated by said resolution information.

3. The far-infrared radiation image processing apparatus according to claim 2, wherein said resolution reception section is capable of storing said resolution information having been input and received.

4. The far-infrared radiation image processing apparatus according to claim 1, wherein said area designation reception means is capable of storing said area designation information having been input and received.

5. The far-infrared radiation image processing apparatus according to claim 1, wherein said resolution conversion section creates said resolution-converted image information by reducing the resolution for the amount of the far-infrared rays applicable to the areas other than said specific area.

6. A far-infrared radiation imaging apparatus configured to take an image by detecting far-infrared rays radiated from an object, said far-infrared radiation imaging apparatus comprising:
   far-infrared radiation imaging means configured to take a far-infrared radiation image so as to output an image signal indicative of said far-infrared radiation image;
   an image signal reception section configured to receive said image signal output by said far-infrared radiation imaging means;
   area designation reception means configured to receive area designation information input to designate a specific area of said far-infrared radiation image; and
   a resolution conversion section configured to convert the resolution for the amount of the far-infrared rays applicable to said specific area designated by said area designation information in said far-infrared radiation image, thereby creating resolution-converted image information,
   wherein for respective pixels of the far-infrared radiation image, said image signal includes a corresponding binary bit sequence of a common predetermined length representing the amount of the far-infrared rays detected at that pixel, and
   said resolution conversion section converts, to a desired resolution, the resolution for the amount of the far-infrared rays applicable to the specific area by extracting, for respective pixels within the specific area, a continuous bit string within the corresponding binary bit sequence for that pixel such that a position of the continuous bit string within the binary bit sequence represents the desired resolution, the continuous bit string having a length smaller than the predetermined length, the continuous bit string being associated with a lower range of temperatures in response to a particular bit of the corresponding binary bit sequence being a first value and being associated with a higher range of temperatures in response to the particular bit being a second value.

7. The far-infrared radiation image processing apparatus according to claim 6, further comprising
   resolution reception means for receiving resolution information input to indicate the desired resolution for use by said resolution conversion means for conversion; wherein said resolution conversion means creates said resolution-converted image information in which the resolution for the amount of said far-infrared rays applicable to said specific area designated by said area designation information is converted to the desired resolution indicated by said resolution information.

8. The far-infrared radiation image processing apparatus according to claim 7, wherein said resolution reception means stores said resolution information having been input and received.

9. The far-infrared radiation image processing apparatus according to claim 6, wherein said area designation reception means stores said area designation information having been input and received.

10. The far-infrared radiation image processing apparatus according to claim 6, wherein said resolution conversion means creates said resolution-converted image information by reducing the resolution for the amount of the far-infrared rays applicable to the areas other than said specific area.

11. A far-infrared radiation image processing method of processing an image taken by detecting far-infrared rays radiated from an object, said far-infrared radiation image processing method comprising:
- receiving an image signal indicative of a far-infrared radiation image taken by a far-infrared radiation camera;
- receiving area designation information input to designate a specific area of said far-infrared radiation image; and
- converting the resolution for the amount of the far-infrared rays applicable to said specific area designated by said area designation information in said far-infrared radiation image, so as to create resolution-converted image information,
- wherein for respective pixels of the far-infrared radiation image, said image signal includes a corresponding binary bit sequence of a common predetermined length representing the amount of the far-infrared rays detected at that pixel, and
- said converting step converts, to a desired resolution, the resolution for the amount of the far-infrared rays applicable to the specific area by extracting, for respective pixels within the specific area, a continuous bit string within the corresponding binary bit sequence for that pixel such that a position of the continuous bit string within the binary bit sequence represents the desired resolution, the continuous bit string having a length smaller than the predetermined length, the continuous bit string being associated with a lower range of temperatures in response to a particular bit of the corresponding binary bit sequence being a first value and being associated with a higher range of temperatures in response to the particular bit being a second value.

12. The far-infrared radiation image processing method according to claim 11, further comprising
- receiving resolution information input to indicate the desired resolution for use by said resolution conversion means for conversion; wherein said resolution conversion step creates said resolution-converted image information in which the resolution for the amount of said far-infrared rays applicable to said specific area designated by said area designation information is converted to the desired resolution indicated by said resolution information.

13. The far-infrared radiation image processing method according to claim 12, wherein said resolution reception step includes storing said resolution information having been input and received.

14. The far-infrared radiation image processing method according to claim 11, wherein said area designation reception step includes storing said area designation information having been input and received.

15. The far-infrared radiation image processing method according to claim 11, wherein said resolution conversion step creates said resolution-converted image information by reducing the resolution for the amount of the far-infrared rays applicable to the areas other than said specific area.

16. A processor encoded with a far-infrared radiation image processing program having instructions for carrying out a far-infrared radiation image processing method of processing an image taken by detecting far-infrared rays radiated from an object, said far-infrared radiation image processing method comprising:
- receiving an image signal indicative of a far-infrared radiation image taken by a far-infrared radiation camera;
- receiving area designation information input to designate a specific area of said far-infrared radiation image; and
- converting the resolution for the amount of the far-infrared rays applicable to said specific area designated by said area designation information in said far-infrared radiation image, so as to create resolution-converted image information,
- wherein for respective pixels of the far-infrared radiation image, said image signal includes a corresponding binary bit sequence of a common predetermined length representing the amount of the far-infrared rays detected at that pixel, and
- said converting step converts, to a desired resolution, the resolution for the amount of the far-infrared rays applicable to the specific area by extracting, for respective pixels within the specific area, a continuous bit string within the corresponding binary bit sequence for that pixel such that a position of the continuous bit string within the binary bit sequence represents the desired resolution, the continuous bit string having a length smaller than the predetermined length, the continuous bit string being associated with a lower range of temperatures in response to a particular bit of the corresponding binary bit sequence being a first value and being associated with a higher range of temperatures in response to the particular bit being a second value.

* * * * *